Dec. 5, 1961   D. A. GOLDMAN   3,011,715
WIND COMPUTER FOR HIGH SPEED AIRCRAFT
Filed March 19, 1959   2 Sheets-Sheet 1

INVENTOR.
DAVID A. GOLDMAN
BY
ATTORNEY.

Dec. 5, 1961 D. A. GOLDMAN 3,011,715
WIND COMPUTER FOR HIGH SPEED AIRCRAFT
Filed March 19, 1959 2 Sheets-Sheet 2

*INVENTOR.*
DAVID A. GOLDMAN
BY
ATTORNEY.

United States Patent Office 3,011,715
Patented Dec. 5, 1961

3,011,715
WIND COMPUTER FOR HIGH SPEED AIRCRAFT
David A. Goldman, Yorktown Heights, N.Y., assignor to General Precision Inc., a corporation of Delaware
Filed Mar. 19, 1959, Ser. No. 800,451
7 Claims. (Cl. 235—187)

This invention relates to aircraft Doppler navigational instruments and more specifically to high speed wind computation and memory devices for use in such instruments.

Doppler microwave navigational instruments normally give output signals representing ground speed and drift angle. If, however, the Doppler information should fail it is desirable to continue the emission of the speed and drift output signals based on the last available data. It is at present the practice, while computing speed and drift from the Doppler input data, also to compute wind speed and direction and to store the information. Upon failure of Doppler data the stored wind data are frozen and utilized. The normal mode of operation, no longer being possible, operation on the "remembered" wind data, commonly termed wind memory mode operation, is commenced.

In the normal mode the inputs to the wind computer are ground speed, $V_g$, air speed, $V_a$, and drift angle $\delta$. The outputs or stored data are wind speed, $V_w$, and wind direction, $W$. In the wind memory mode the inputs to the wind computer are $V_a$, $V_w$ and $W$, and the outputs for use in memory navigation are $V_g$ and $\delta$.

Wind computers are generally constructed to solve the vector triangle having sides composed of the three vector quantities $V_g$, $V_a$ and $V_w$. However, with the increase of aircraft speeds the angle between air and ground speed vectors becomes small, so that errors in resolver methods heretofore used become prohibitively large. Accordingly, a modified wind triangle solution has been devised, and used, by which the subtraction of resolver outputs, which are large and nearly equal, is avoided.

The present invention employs this modified wind triangle and thus avoids the trigonometric manipulation of two nearly equal quantities and in addition, provides a simplified instrumentation. The solution is exact except that in instrumentation of the sine of small angles an approximate sine generator is employed. This produces negligible error.

The apparatus of the invention includes a differential gear for precisely securing the difference between air speed and ground speed. Trigonometric error equations including this difference, $V_g-V_a$, are instrumented for simultaneous solution by a group of two resolvers and two potentiometers. In the normal mode the wind data are stored in a potentiometer and a control transformer. In going to the wind memory mode these instruments are immobilized, thus "freezing" or preserving their last-received data.

The purpose of this invention is to provide a simple Doppler instrument wind computer for high speed aircraft.

A further understanding of this invention may be secured from the detailed description and drawings, in which:

FIGURE 3 is a schematic diagram of an embodiment of the invention.

Figure 1:
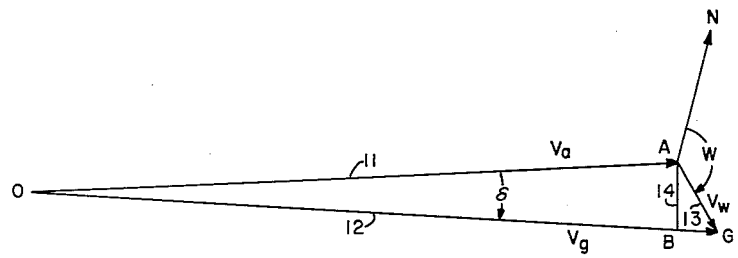
FIGURE 1 depicts a vector triangle having aircraft ground velocity, aircraft air velocity and the wind velocity as its sides.

Referring now to FIG. 1, this vector triangle therein illustrated depicts the maximum $V_a$, $V_g$ and $V_w$ vectors for a 2000-knot aircraft. A maximum wind of 250 knots is assumed. This triangle OAG is shown approximately to scale. The angle between the air velocity ($V_a$) vector 11 and ground velocity ($V_g$) vector 12 is the drift angle $\delta$. The side 13 represents wind velocity ($V_w$) relative to the ground and directed at angle $W$ from the North direction. The line 14 is draw from A to B to form an isosceles triangle OAB and a much smaller obtuse triangle ABG. The present invention is based on a trigonometric solution of the small obtuse triangle ABG, solving for $V_w$ and $W$ in the normal mode and for $\delta$ and $V_g$ in the wind memory mode. This gives about ten-fold increase of accuracy compared with a solution of the large acute triangle OAG containing the small angle $\delta$, for the subtraction of trigonometric functions involving the large and nearly equal vectors $V_a$ and $V_g$ would magnify their errors in the difference obtained.

Figure 2:
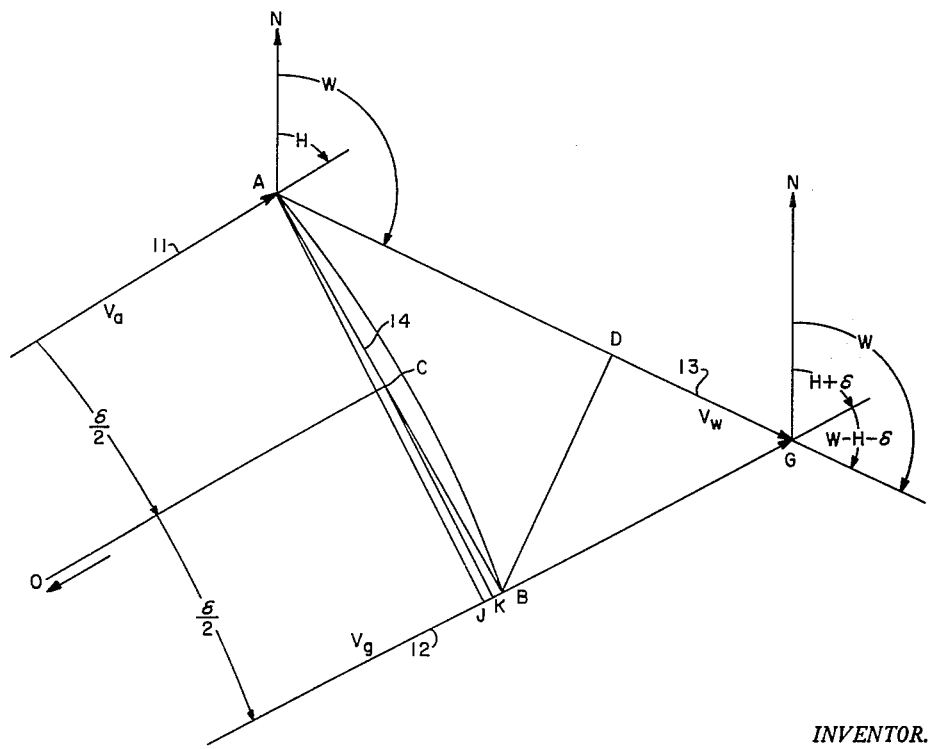
FIGURE 2 depicts a derived triangle which serves as the geometrical basis for the instrumentation of this invention.
Figure 2:
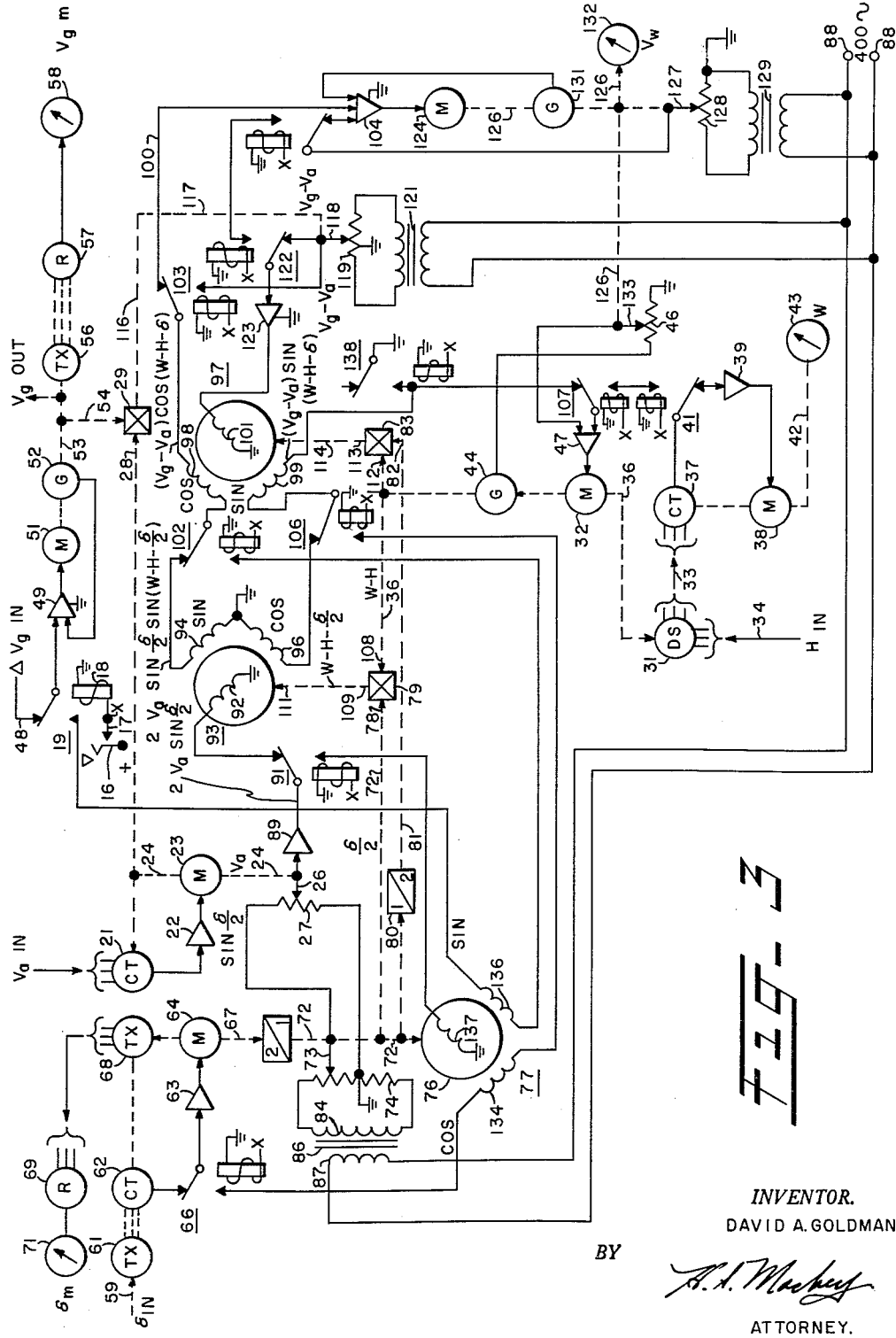

The triangle ABG is drawn to a more convenient scale in FIG. 2. In order to develop equations suitable for instrumentation the line OC is drawn bisecting angle $\delta$ FIGS. 1 and 2. Line AB (side 14) is drawn perpendicular to line OC so that $OB=OA$. Then, in the right triangle OCB, $$\text{side } CB = V_a \sin \frac{\delta}{2}$$

and $$\text{angle } CBO = 90° - \frac{\delta}{2}$$

$$\text{Also } AB = 2V_a \sin \frac{\delta}{2}$$

In the obtuse triangle ABG, $$\text{angle } ABG = 90 + \frac{\delta}{2}$$

Also the angle between the North direction and side OA extended is the heading angle, $H$, and the angle between the North direction and the side BG extended is $H+\delta$. Therefore the angle $AGB=W-H-\delta$. Now draw the line BD perpendicular to the side AG. In the triangle DGB, angle $DBG=90°-(W-H-\delta)$. In the triangle DBA, $$\text{angle } DBA=90°+\frac{\delta}{2}-[90°-(W-H-\delta)]=W-H-\frac{\delta}{2}$$

From these relations, in triangle DBG, $$DB=(V_g-V_a)\sin(W-H-\delta)$$

and in triangle DBA $$DB=2V_a \sin \frac{\delta}{2} \cos\left(W-H-\frac{\delta}{2}\right)$$

Equating, $$(V_g-V_a)\sin(W-H-\delta) -2V_a \sin \frac{\delta}{2} \cos\left(W-H-\frac{\delta}{2}\right)=0 \quad (1)$$

The side AG consists of two parts, AD and DG. When these parts are represented trigonometrically in their respective triangles ADB and GDB, there results $$AD=2V_a \sin \frac{\delta}{2}\left(W-H-\frac{\delta}{2}\right)$$

and $$DG=(V_g-V_a)\cos(W-H-\delta)$$

When added and equated to $V_w$ representing the side AG:

$$(V_g - V_a) \cos(W - H - \delta) + 2V_a \sin\frac{\delta}{2} \sin\left(W - H - \frac{\delta}{2}\right) = V_w \quad (2)$$

These two equations, 1 and 2, are instrumented to secure the normal mode solution, as will be described.

To derive equations for operation in the wind memory mode, lines CK and AJ are drawn, both perpendicular to OB.

In triangle KCB, $$\text{angle } KCB = \frac{\delta}{2}$$

and in triangle JAB, $$\text{angle } JAB = \frac{\delta}{2}$$

In triangle AJG, $$\text{side } JG = JB + BG$$
$$JG = V_w \cos(W - H - \delta)$$
$$BG = V_g - V_a$$
$$JB = V_w \cos(W - H - \delta) - (V_g - V_a)$$

Also, in triangle AJB $$JB = 2V_a \sin\frac{\delta}{2} \sin\frac{\delta}{2}$$

Equating, $$V_w \cos(W - H - \delta) - 2V_a \sin^2\left(\frac{\delta}{2}\right) = V_g - V_a \quad (3)$$

In the triangle AJB, $$AJ = AB \cos\frac{\delta}{2}$$
$$= 2V_a \sin\frac{\delta}{2} \cos\frac{\delta}{2}$$

In the triangle AJG, $$AJ = V_w \sin(W - H - \delta)$$

Equating, $$2V_a \sin\frac{\delta}{2} \cos\frac{\delta}{2} - V_w \sin(W - H - \delta) = 0 \quad (4)$$

Equations 3 and 4 are instrumented for solution in the wind memory mode, as will be described.

FIG. 3 depicts instrumentation for both the normal mode and the wind memory mode solution together with a number of solenoid switches for switching between the normal mode circuit and the wind memory mode circuit. These switches may be operated either automatically or by a manually-operated switch, the latter method being shown as illustration. For example, the manual two-position switch 16 is shown with conductor 17 connected to solenoid 18 of solenoid switch 19. Duplicates of the conductor 17 are also connected to all solenoids of the other solenoid switches. These duplicate multiple connections are omitted for clarity but are indicated by the letter $x$ at conductor 17 and by the same letter $x$ at each of the other solenoids.

Airspeed data, $V_a$, are received from an airspeed meter as electrical 3-wire synchro signals applied to a control transformer 21. The output is amplified and converted to an analogous shaft displacement by a servomechanism including the control transformer 21, an amplifier 22 and a motor 23. The shaft displacement of the output shaft 24 is fed back to the control transformer 21 and is also connected to position the slider 26 of a potentiometer 27 and to position one input terminal 28 of a gear differential 29.

Heading angle data, H, in the form of electrical synchro signals are received by a differential synchro 31. This differential synchro is positioned by a motor 32 so that its output signals on conductors 33 differ in phase angle from the input H signals on conductors 34 by the angular deflection of the motor shaft 36. When, therefore, the shaft 36 is positioned to an angle representing the difference of the heading and wind angles, or $W - H$, the angle represented by the signals in conductors 33 is the wind direction angle W. Conductors 33 are connected to a servomechanism comprising control transformer 37, motor 38, amplifier 39 and solenoid switch 41. The electrical signals in these conductors 33 representing wind angle are converted by the servomechanism into an analogous deflection of shaft 42. This deflection is indicated by indicator 43.

The motor 32 is provided with a feedback loop including tachometer generator 44, potentiometer 46 and amplifier 47. This feedback loop has an integrating or smoothing purpose, introducing a time lag which is larger for larger feedback currents. The potentiometer is varied in accordance with $V_w$ in such sense that when $V_w$ is small, the feedback current is small and the loop time constant is small, with consequently small smoothing or filtering action.

In the normal mode of operation ground speed data, $\Delta V_g$, are received as electrical signals in conductor 48. They are applied through the solenoid switch 19 to a servomechanism comprising amplifier 49, motor 51 and tachometer generator 52. The output shaft 53 having a displacement proportional to $V_g$ is used to position the other input terminal 54 of differential 29 and to position a synchro transmitter 56. The angular displacement of the synchro 56 is electrically transmitted to position a repeater 57 and a dial 58 indicating ground speed. Alternatively the repeater 57 may be a control transformer. The indicator 58 indicates ground speed in both normal and wind memory modes of operation.

In the normal mode of operation drift angle data, $\delta$, are received as angular displacements of a shaft 59. This shaft positions a synchro transmitter 61 which transmits its data signals to a servomechanism including a control transformer 62, amplifier 63 and motor 64. Contacts of a solenoid switch 66 are included in the direct servomechanism data path. The motor shaft 67 has an angular displacement representing the drift angle $\delta$. It is employed to position a synchro transmitter 68, receiver 69 and dial 71 indicating $\delta$ in both normal and wind memory modes. The shaft 67 also, through a 2:1 gear reducing the angular deflection to represent $$\frac{\delta}{2}$$

drives shaft 72, the slider 73 of a potentiometer 74 and the rotor 76 of a resolver 77. Shaft 72 also drives one input terminal 78 of a gear differential 79, and through a 1:2 gear 80 and shaft 81 drives one input terminal 82 of a gear differential 83.

The potentiometer 74 is connected across the secondary winding 84 of a transformer 86 having its primary winding 87 excited from 400-cycle power terminals 88. The potentiometer center tap is grounded and its slider 73 is loaded by the potentiometer 27 connected between it and ground. This arrangement constitutes an approximate sine generator, for the potential between slider 73 and ground varies with its displacement from its center ground tap zero position almost sinusoidally. The error is negligible when the slider displacements are defined as representing small angles. Thus if the maximum slider displacement represents a maximum value for $$\frac{\delta}{2}$$

of 3½°, the maximum value which $\delta$ can have under the conditions of FIG. 1, the potential across the terminals of potentiometer 27 will represent $$\sin \frac{\delta}{2}$$

without appreciable error.

The potential on slider 26 is equal to the potentiometer 27 potential multiplied by a factor representing the slider position. This product, after amplification in an amplifier 89, is applied through a solenoid switch 91 to the armature coil 92 of a resolver 93 having two orthogonally positioned stationary windings 94 and 96. This resolver is so phased that winding 94 potential is proportional to the sine and winding 96 potential is proportional to the cosine of the resolver angle.

A second resolver 97 has a stationary cosine winding 98, a stationary sine winding 99 and a rotor winding 101. Windings 94 and 98 are connected in series through a solenoid switch 102. The remaining end of winding 98 is connected through a solenoid switch 103 and conductor 100 to one input terminal of an amplifier 104. Windings 96 and 99 are connected in series through a solenoid switch 106. The other end of winding 99 is connected through a solenoid switch 107 to a second input of the amplifier 47.

The gear differentials 79 and 83 are connected to motor shaft 36. Thus differential 79 has input terminals 78 and 108 connected to shafts 72 and 36, and delivers at its output terminal 109 and shaft 111 an angular displacement which is equal to the difference of the angular displacements of the inputs. Differential 83 has its two input terminals 82 and 112 connected to shafts 81 and 36, and delivers at its output terminal 113 and shaft 114 an angular displacement which is equal to the difference of the angular displacement of the inputs. Shaft 111 is connected to position the rotor of resolver 93, and shaft 114 is connected to position the rotor of resolver 97.

The gear differential 29 is arranged to produce at its output terminal 116 an angular deflection which is the difference of the angular deflections of its input terminals 28 and 54. The output terminal 116 positions a shaft 117 and a potentiometer slider 118 of a potentiometer 119. This potentiometer is energized through a transformer 121 from the 400-cycle power terminals 88. The potential of slider 118, through a solenoid switch 122 and amplifier 123, is applied to the rotor coil 101 of resolver 97.

Signals applied to amplifier 104 from conductor 100 and resolver winding 98 are amplified and applied to motor 124. The motor shaft 126 drives the slider 127 of a potentiometer 128 energized through a transformer 129 from the 400-cycle power terminals 88. The slider 127 potential is fed back to the amplifier 104, so that a servomechanism is formed in which the angular displacement of the shaft 126 and of slider 127, and the 400-cycle potential proportional thereto, are all proportional to the input signal in conductor 100. A tachometer generator 131 driven by shaft 126 and fed back to amplifier 104 improves accuracy and increases the time constant. Shaft 126 is connected to an indicator 132 indicating wind speed, $V_w$. Shaft 126 is also connected to the slider 133 of potentiometer 46.

The resolver 77 is switched into circuit only in the wind memory mode of operation of the wind computer. This resolver 77 has a fixed winding 134 so arranged that its potential is proportional to the cosine of the rotor angle. Its terminals are connected to contacts of the solenoid switches 66 and through solenoid switch 106 to winding 99, and a solenoid switch 138 completes the circuit of this winding in wind memory operation by grounding one end. A second fixed winding 136 emits a potential proportional to the sine of the rotor angle. Its terminals are connected to contacts of the solenoid switches 19 and 102. The rotor winding 137 of resolver 77 is connected to solenoid switch 91.

In operation of the wind computer in the normal mode, with all solenoid switches in the positions shown in FIG. 3, electrical signals representing H, $V_a$ and $V_g$ data are received and a mechanical shaft angular displacement is received representing $\delta$ data. These data are applied to the servomechanism instrumentation, which operates on them in accordance with Equations 1 and 2 for the simultaneous solution of these equations to produce the output quantities $V_w$ and W.

Equation 2 is instrumented as follows. The drift angle, $\delta$, represented by the angular deflection of input shaft 59 is reproduced as a proportionate deflection of shaft 67, and by a deflection of half that amount by shaft 72, representing $$\frac{\delta}{2}$$

This is converted into an electrical signal representing $$\sin \frac{\delta}{2}$$

at slider 73 by the described action of loaded potentiometer 74. Potentiometer 27 acts both as loading for potentiometer 74 and also as a multiplier. Its slider 26 being moved proportionally to $V_a$, the slider 26 potential is proportional to $$V_a \sin \frac{\delta}{2}$$

This potential being amplified in amplifier 89, the choice of the amount of amplification and of other scale constants results in the potential applied to rotor coil 92 representing $$2V_a \sin \frac{\delta}{2}$$

Let it be assumed that shaft 36 is positioned at an angular deflection representing the angle $(W-H)$. It will be evident later, on consideration of the entire operation, that shaft 36 is so positioned. The subtracting differential 79 then positions the shaft 111 and rotor winding 92 at an angle representing $$\left(W-H-\frac{\delta}{2}\right)$$

The output winding 94 therefore emits an induced potential equalling the rotor potential multiplied by the sine of the rotor angle, thus representing $$2V_a \sin \frac{\delta}{2} \sin \left(W-H-\frac{\delta}{2}\right)$$

Similarly, the cosine winding 96 emits a potential representing $$2V_a \sin \frac{\delta}{2} \cos \left(W-H-\frac{\delta}{2}\right)$$

The input signal at conductor 48 representing ground speed differential, $\Delta V_g$, is converted to a representative angular deflection of shaft 53 by the servomechanism consisting of amplifier 49, motor 51 and generator 52. The subtracting differential 29 takes the difference of this deflection and that of shaft 24 so that the angular deflection at its output terminal 116 represents $V_g - V_a$. This angular deflection is employed to position slider 118 of potentiometer 119, which converts the shaft angular position to a potential representing it. After scaling by amplification in amplifier 123 this potential representing $V_g - V_a$ is applied to the rotor coil 101 of resolver 97.

The subtracting differential 83 emits an angular deflection representing $W - H - \delta$, and positions shaft 114 and rotor winding 101 to that angle. Accordingly the cosine winding 98 has induced in it a potential equalling the rotor potential multiplied by the cosine of the shaft angle, thus representing $(V_g - V_a) \cos (W - H - \delta)$. Similarly the sine winding 99 potential represents $(V_g - V_a) \sin (W - H - \delta)$.

The potentials of windings 94 and 98 are added because these windings are connected in series aiding, and the sum at null represents $V_w$ as shown in Equation 2. This potential is applied to amplifier 104, and is converted by the servomechanism consisting of this amplifier, motor 124 and generator 131 to a deflection of shaft 126, slider 127 and indicator 132 representative of $V_w$.

The deflection of shaft 126 is also applied, as stated, to position slider 133. The effect of this is to control the time constant of the $(W - H)$ servomechanism including motor 32 in proportion to $V_w$. The purpose of this is, however, merely to control the rate feedback proportionally to $V_w$.

The potentials of windings 96 and 99 are subtracted by connecting these windings in series opposition. The difference of these potentials constitutes the signal applied to motor 32 and when, as the rotors of resolvers 93 and 97 are rotated, the two potentials become equal and opposite, the signal to motor 32 becomes zero and it stops. This nulling action constitutes the automatic solution of Equation 1 to produce the correct value for $W - H$ and consequently for $W$ at the motor null position, and simultaneously solves Equation 2 for $V_w$.

In the wind memory mode all eleven solenoid switches are moved to the positions opposite those shown in FIG. 3. The input $\delta$ data servomechanism circuit is thereby opened so that motor 64 is removed from control by the synchro transmitter 61. Similarly, the ground speed input data circuit is broken so that motor 51 is removed from control by input $V_g$ signals at conductor 48. The wind speed servomechanism motor 124 is immobilized by opening its input circuits, causing slider 127 of potentiometer 128 to stay at its then attained position. This "freezes" the indication of the wind speed indicator 132. It also causes a constant potential signal representing the "frozen" value of $V_w$ to be applied from slider 127 through amplifier 123 to the rotor winding 101 of resolver 97. The wind angle servomechanism motor 38 is immobilized, its input amplifier being open, so that the wind angle indicator 43 is "frozen" at its then attained angle as is also the control transformer 37.

Positioning of the $W - H$ shaft 36 is now no longer in accordance with Equation 1 but instead is controlled by the error signal from the immobilized control transformer 37 through amplifier 47 to motor 32. The angle $W - H$ now changes with $H$ only.

The sine winding 99 of resolver 97 now has induced in it a potential representing $V_w \sin (W - H - \delta)$. The rotor 137 of resolver 77 is energized by the potential representing $$2V_a \sin \frac{\delta}{2}$$

Assuming that its positioning is in accordance with $$\frac{\delta}{2}$$

the winding 134 has potential induced in it representing $$2V_a \sin \frac{\delta}{2} \cos \frac{\delta}{2}$$

In the wind memory mode winding 99 of resolver 97 is grounded at solenoid switch 138, and through solenoid switch 106 is connected in series opposed with winding 134 of resolver 77. The other end of the latter winding is connected through solenoid switch 66 to amplifier 63, so that any difference in the opposed potentials of these windings 99 and 134 operates motor 64. This motor rotates shaft 72 in such direction, changing $$\frac{\delta}{2}$$

as to reduce and eliminate this difference. Thus, in accordance with Equation 4 balance at null is automatically effected. At null, then, the true values of $$\frac{\delta}{2}$$

and $\delta$ have been generated and set into resolvers 77 and 97.

The potential of winding 98 of resolver 97 represents $V_w \cos (W - H - \delta)$. The potential of winding 136 of resolver 77 represents $$2V_a \sin^2 \left(\frac{\delta}{2}\right)$$

These windings are connected in series through solenoid switch 102, and additionally through solenoid switch 19 are connected in series with the input of amplifier 49. Thus motor 51 is started if the potentials of windings 136 and 98 are different, and moves slider 118 in such a direction as to bring its own input signal to zero. In this automatic solution of Equation 4 as described above the Equation 3 is also solved. These solutions provide at all times values of $V_g$ and $\delta$ which are correct, on the assumption of unchanging wind, in any variations of aircraft speed or course.

The output shaft angular deflection of motor 51 represents ground speed in wind memory operation, termed $V_{gm}$. This shaft angle is converted to an electrical signal by a synchro transmitter 56 and synchro receiver 57, and the angle is indicated by indicator 58.

The aircraft drift angle in wind memory operation, $\delta_m$, is represented by the angular deflection of shaft 67 of motor 64. This angle is converted to an electrical signal representing it by a synchro transmitter 68 and synchro receiver 69, and is indicated by an indicator 71.

What is claimed is:

1. A wind computer comprising means producing a drift angle signal, means producing an airspeed signal, means energized by said drift angle and airspeed signals producing a product signal representative of the product of a multiple of the airspeed signal and the sine function of a fraction of the drift angle signal, a first resolver having an input winding and sine and cosine output windings, said resolver having said product signal applied to its input winding, means producing a ground speed signal, a second resolver having an input winding and sine and cosine output windings, means applying a signal representative of the difference of said ground speed signal and said air speed signal to the input winding of said second resolver, means operated by the signal produced in the cosine output winding of said first resolver and the signal produced in the sine output winding of said second resolver for producing a wind direction signal, means adjusting the positions of said first and second resolvers in accordance with signals representative of the differences of said wind direction signal and signals whose magnitudes are proportional to the magnitudes of said drift angle signals, and means obtaining a wind velocity signal from the sum of the signals produced by the sine output windings of said first resolver and the cosine output winding of said second resolver.

2. A wind computer comprising, means producing a drift angle signal, means producing an airspeed signal, means energized by said drift angle and airspeed signals producing a product signal representative of the product of twice the airspeed and the sine function of half drift angle, a first resolver having an input winding and sine and cosine output windings, said resolver having said product signal applied to its input winding, means producing a ground speed signal, a second resolver having an input winding and sine and cosine output windings, means applying a signal representative of the difference of said ground speed signal and said airspeed signal to the input winding of said second resolver, means operated by the difference of the signals generated in the cosine output winding of said first resolver and the sine output winding of said second resolver for producing a wind direction signal, means adjusting the position of said second resolver in accordance with the difference of said wind direction signal and said drift angle signal, means adjusting the position of said first resolver in accordance with the difference of said wind direction signal and a signal representative of half drift angle, and means obtaining a wind velocity signal from the sum of the signals generated by the sine output winding of said first resolver and the cosine output winding of said second resolver.

3. A wind computer in accordance with claim 2 including a third resolver, switch means operative to a selected position for deenergizing said first resolver and for interconnecting said third resolver and said second resolver and computing drift angle and ground speed from the airspeed signal and the value of said wind velocity signal and wind direction signal attained just prior to the operation of said switch means.

4. A wind computer comprising, means producing a drift angle signal, means producing an airspeed signal, means energized by said drift angle and airspeed signals producing a product signal representative of the product of twice the airspeed and the sine function of half drift angle, a first resolver having an input winding and sine and cosine output windings, said resolver having said product signal applied to its input winding, means producing a ground speed signal, means subtracting said airspeed signal from ground speed signal to produce a difference signal, a second resolver having an input winding and sine and cosine output windings, said second resolver having said difference signal applied to its input winding, means operated by the difference of the signals generated in the cosine output winding of said first resolver and the signal generated in the sine output winding of said second resolver for producing an error signal, servo means having said error signal applied to its input and including an output shaft the angle of rotation of which is determined by the error signal input, first and second gear differential each having a first input shaft connected to the output shaft of said servo means, said first differential having a second input shaft positioned at half the drift angle and an output shaft connected to rotate said first resolver, said second differential having a second input shaft positioned at the drift angle and an output shaft connected to rotate said second resolver, and means producing a wind velocity signal from the sum of the signals generated by the sine output winding of said first resolver and the cosine output winding of said second resolver.

5. A wind computer as set forth in claim 4 including a third resolver, switch means operative to a selected position for deenergizing said first resolver and for interconnecting said third resolver and said second resolver and computing drift angle and ground speed from the airspeed signal and the value of the wind velocity signal and position attained by the output shaft of said servo means just prior to the operation of said switch means.

6. A wind computer comprising, means producing a drift angle signal, means producing an airspeed signal, means energized by said drift angle and airspeed signals producing a product signal representative of the product of twice the airspeed and the sine function of half drift angle, a first resolver having an input winding and sine and cosine output windings, said resolver having said product signal applied to its input winding, means producing a ground speed signal, means including a pair of shaft members converting said airspeed and ground speed signals into equivalent rotations of said shaft members, a first gear differential having a pair of input shafts connected to said shaft members and having an output shaft the angular position of which represents the difference between its input shaft positions, a potentiometer having a slider positioned by the output shaft of said first differential and producing a difference signal at said slider, a second resolver having an input winding and sine and cosine output windings, said second resolver having said difference signal applied to its input winding, means operated by the difference of the signals generated in the cosine output winding of said first resolver and the signal generated in the sine output winding of said second resolver for producing an error signal, first servo means having said error signal applied to its input and including an output shaft the angle of rotation of which is determined by the error signal input, second and third gear differentials each having a first input shaft connected to the output shaft of said servo means, said second differential having a second input shaft positioned at half the drift angle and an output shaft connected to rotate said first resolver, said third differential having a second input shaft positioned at the drift angle and an output shaft connected to rotate said second resolver, means producing a wind velocity signal from the sum of the signals generated by the sine output winding of said first resolver and the cosine winding of said second resolver, and second servo means having said wind velocity signal impressed on its input and including an output shaft the angle of rotation of which is determined by the then existing value of said wind velocity signal.

7. A wind computer as set forth in claim 6 including a third resolver, switch means operative to a selected position for deenergizing said first resolver and for interconnecting said second and third resolvers and computing drift angle and ground speed from the airspeed signal and the positions attained by the output shafts of said first and second servo means just prior to the operation of said switch means.

References Cited in the file of this patent

UNITED STATES PATENTS 2,849,184    Fredrick et al. _____ Aug. 26, 1958
2,919,856    Gray _____ Jan. 5, 1960

OTHER REFERENCES

Control Engineering, "These Steps Lead to Good Computers"; vol. 2, No. 6, pp. 76–82.